United States Patent

[11] 3,547,154

[72] Inventor Ralph E. Benham
  Arcadia, Calif.
[21] Appl. No. 796,715
[22] Filed Feb. 5, 1969
[45] Patented Dec. 15, 1970
[73] Assignee Purex Corporation, Ltd.
  Lakewood, Calif.
  a corporation of California

[54] IRRIGATION TIMING CONTROL APPARATUS
  26 Claims, 7 Drawing Figs.
[52] U.S. Cl. .................................................. 137/624.11;
  251/129; 239/70
[51] Int. Cl. ...................................................... A01g 27/00;
  F16k 31/02
[50] Field of Search .......................................... 137/624.11,
  624.18; 251/129, 131; 239/70; (Inquired cl 200)

[56] References Cited
UNITED STATES PATENTS
3,063,643  11/1962  Roberts ...................... 137/624.11X
3,250,294  5/1966  Hipple ......................... 137/624.11X Primary Examiner—Alan Cohan
Attorney—White and Haefliger ABSTRACT: Irrigation control apparatus including a solenoid actuated valve controlling water delivery from a supply, and a timer for the valve comprising a battery powered device having first and second capacitors each storing charge sufficient to actuate the valve through the solenoid, a magnetically operated switch for connecting the capacitors to the battery simultaneously, actuating means for the switch including a magnet having time related movement, means for blocking battery connection to the capacitors upon selected switch actuations, means discharging the first capacitor through the solenoid in a manner to open the valve, means discharging the second capacitor in a manner to close the valve, means interrupting charging of the capacitors upon discharge, and means delaying discharge of the second capacitor for a preselected period corresponding to a desired length irrigation period, said capacitor discharging means including for the first and second capacitor trigger diodes sensing the stored charge level in an associated capacitor and an SCR triggered by the diode to sequentially discharge the capacitors through the solenoid coil.

PATENTED DEC 15 1970

INVENTOR.
RALPH E. BENHAM
By White & Haefliger
ATTORNEYS.

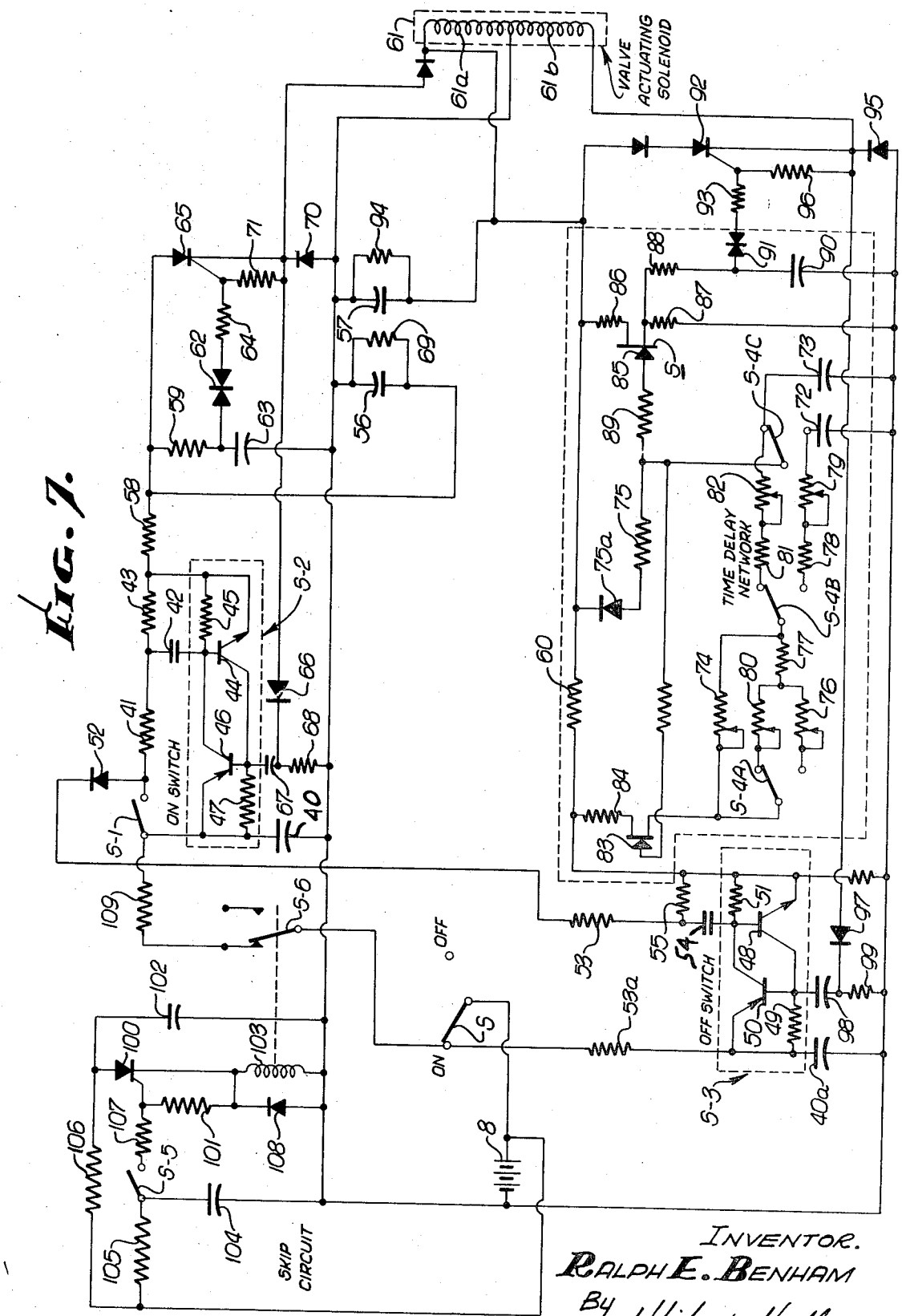

IRRIGATION TIMING CONTROL APPARATUS

BACKGROUND OF THE INVENTION

1. Field of the Invention

This invention has to do with irrigation and particularly with apparatus for the time controlled operation of irrigation systems. The present apparatus is capable of self-contained operation using a battery as its sole power source. Moreover, great flexibility in operating cycle length and serial recurrence of cycle is provided in addition to automatic or manual operation adaptability.

Irrigation is widely practiced in the American Southwest to render productive or ornamental great land areas which are deprived of sufficient natural rainfall. Vagaries of weather in areas receiving adequate rainfall normally are overcome too by provision of automatic watering systems.

Because of the common vastness of areas to be irrigated and/or their remoteness to available power lines, it is presently the practice to hand operate the valves controlling these irrigation systems. Rising labor cost makes this practice increasingly less desirable but the capital requirements for previously available alternatives, e.g. electrical wiring, have been prohibitive.

2. Prior Art

Electrically operated valves are well known. These valves typically employ a diaphragm as the actual valve plate and utilize a solenoid actuated plunger to move the diaphragm to the "valve open" or "valve closed" position. Unlike many valve uses the irrigating valve must be kept open for relatively long periods e.g. an hour or more to insure adequate water penetration of the soil and hence the solenoid coil in the past has had to be kept active to retain the plunger in the "valve open" position. This requirement has precluded the use of battery powered valve controllers since no economical source of battery power was known capable of handling the unduly long power requirement.

SUMMARY OF THE INVENTION

It is an object of this invention to provide a control system for irrigation valves which may be automatic in operation, which may be cycled to various operating intervals and irrigating periods and which may utilize a battery as the sole power supply for valve operation.

In general, the invention provides apparatus for the timed operation of an irrigating system valve having a solenoid operated actuator which includes first means supplying current to the solenoid in a first direction to open the valve, second means including a delay means supplying current to the solenoid in the reverse direction to close the valve, a power supply which may be a battery, and switch means to connect the power supply to the first and second current supplying means to open the valve for a period determined by the time delay means. The switch means may comprise a magnetically responsive switch such as one having normally spaced contacts which are deflectable into contacting relation in a magnetic field and actuating magnet means which are relatively movable e.g. the magnet means may have timed-related continuous movement relative to the switch. To move the magnet means, there may be provided a clock means having a motor and a rotating member driven by the motor, the rotating member being arranged to have portionwise continuous proximity to the switch and being adapted to carry the magnet means angularly thereon into and out of actuating proximity with the switch. The clock rotating member may be driven at the rate of one or more revolutions per day and be subdivided into plural portions corresponding to the revolution rate, each portion being provided with alternatively useful magnet retaining means such as apertures formed in the rotating member in circularly spaced relation about the member axis into which the magnet body is receivable for carriage on the member past the switch means.

In the present timer apparatus typically the first current supplying means includes a first capacitor storing charge from the battery and means discharging the first capacitor through the coil of the solenoid upon a predetermined level of charge being stored in the capacitor sufficient to actuate the valve. An electronic switch may be provided between the magnetically responsive switch and the first capacitor arranged to be turned on by the closing of the magnetically responsive switch and to be turned off by other means on discharge of the first capacitor, to interrupt capacitor charging by the battery. The first capacitor discharging means typically includes a trigger diode responsive to the level of charge on the first capacitor and an SCR triggered by the diode to supply current to the coil of the solenoid to actuate the valve and to the electronic switch to turn that switch off interrupting charging of the first capacitor.

The second current supplying means includes a second capacitor storing charge from the battery preferably more rapidly than the first capacitor and means discharging the second capacitor through the coil of the solenoid upon passage of a predetermined time delay to reverse actuate the valve. An electronic switch may be provided between the magnetically responsive switch and the first capacitor arranged to be turned on by the closing of the magnetically responsive switch and to be turned off by other means on discharge of the first capacitor, to interrupt charging thereof. The second capacitor discharging means typically includes a trigger diode arranged to sense the level of charge stored in a time delay capacitor forming part of the time delay means and an SCR triggered by the diode to discharge the second capacitor and to supply current to the solenoid coil to actuate the valve, and to the associated electronic switch to turn the switch off and interrupt the charging of the second capacitor. The first and second capacitors may each be connected in parallel with a resistor to insure complete discharge of the capacitors at each cycle.

With regard to the time delay means the time delay capacitor has a constant current source connected thereto to charge the same to a level sufficient to activate the trigger diode. For different time delay periods a second and different time delay means having a second time delay capacitor may be provided, along with means for alternately connecting the SCR trigger diode to either of the time delay capacitors. In addition variable resistances may be provided in series with the time delay capacitors to further vary the time delay period.

A further feature of the invention is provision for omission of a cycle e.g. the cycle on 1 or 2 days out of 7 may be omitted. To accomplish this means selectively blocking connection of the power supply to the first and second current supply means by the closing of the magnetically responsive switch means may be provided such as normally closed blocking switch openable to block power supply connection in response to the occurrence of a predetermined number of such connections.

BRIEF DESCRIPTION OF THE DRAWINGS

FIG. 7 is a schematic of a typical circuit for the timer apparatus.

DESCRIPTION OF THE PREFERRED EMBODIMENTS

Figure 1:
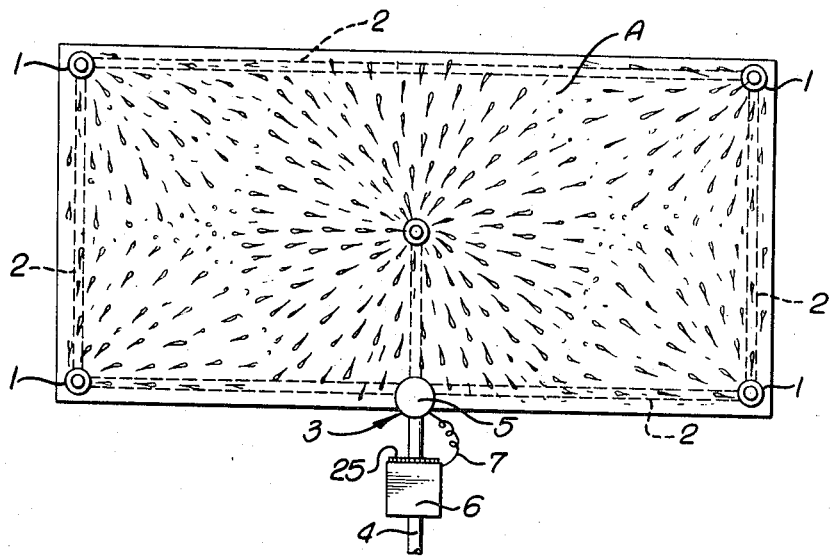
FIG. 1 is a pictorial view of an irrigation system.

With reference to the drawings, in FIG. 1 land area A is provided with a plurality of irrigating heads 1 for sprinkling the area. Heads 1 are connected by piping 2 which is connected at 3 to a water supply pipe 4 leading from a water supply (not shown). At the pipe junction 3 an electrically controlled valve 5 of a conventional type is depicted to control water flow to the piping 2. A timing control device 6 is shown secured to the supply pipe 4 and connected to the valve 5 with lead 7.

Figure 6:
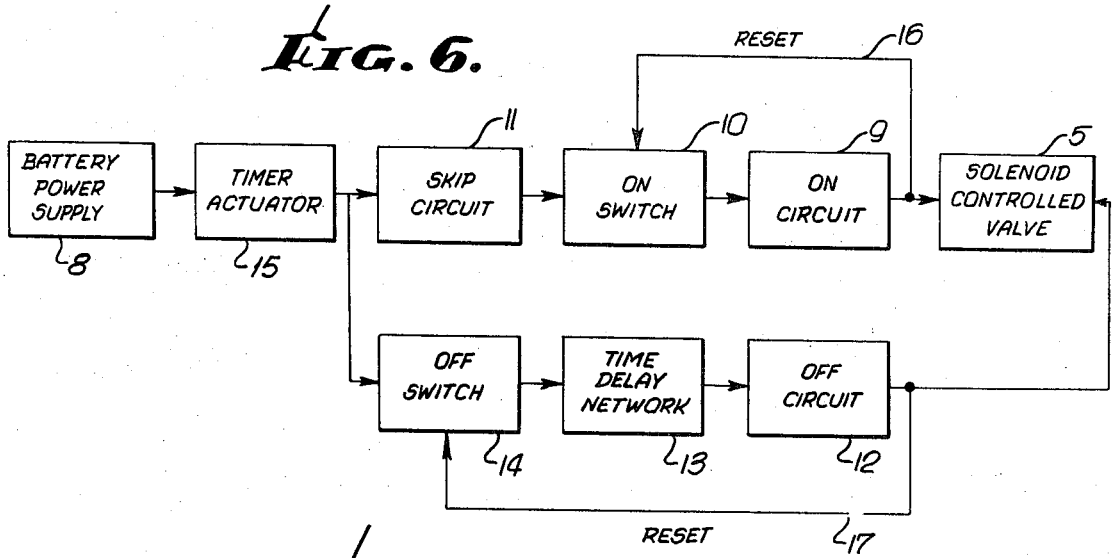
FIG. 6 is a diagrammatic view of the timer control apparatus.

The present invention is concerned primarily with the valve operation timing device 6. In FIG. 6 the basic elements are shown in their functional arrangement. The solenoid controlled valve 5 is connected to receive actuating current from the power supply, battery 8, through either of two circuits, either the "on" circuit 9 connectable to the battery through "on" switch 10 and skip circuit 11 (the function of which is hereinafter fully explained) or through "off" circuit 12 connectable through the time delay netword 13 (also hereinafter explained) and "off" switch 14. As thus arranged it is apparent that the apparatus employs for operation of a solenoid actuated valve a first means supplying current to the solenoid in the form of "on" circuit 9 in a direction to open the valve 5 and a second means supplying current to the solenoid in the reverse direction to close the valve in the form of "off" circuit 12. The power supply battery 8 is connected to the respective circuits in response to operation of timer actuator 15 which closes a switch 30 (shown best in FIG. 5) to close the circuit between the battery 8 and the "on" circuit 9 and "off" circuit 12. In each circuit an electronic switch is provided, switch 10 connected to the "on" circuit 9 and switch 14 connected to the "off" circuit 12 through the time delay network 13. In operation of these elements the timer actuator 15 acting in a predetermined manner closes the circuit between battery 8. "On" switch 10 then closes if the skip circuit 11 does not block current flow and the current is passed through the on circuit 9 to the solenoid controlled valve 5 to turn on the valve. Simultaneously a pulse is passed back to the "on" switch 10 along line 16 to open the switch and reset the same for subsequent cycles. As the valve is being opened by the "on" circuit, the "off switch" is also closed as the timer actuator 15 closes. This passes current from battery 8 to the time delay netword 13 and after a delay through the "off" circuit 12 to the solenoid controlled valve 5 to turn off the valve. Simultaneously a pulse is passed back to the "off" switch 14 along line 17 to open the switch and reset the same for subsequent cycles.

Figure 2:
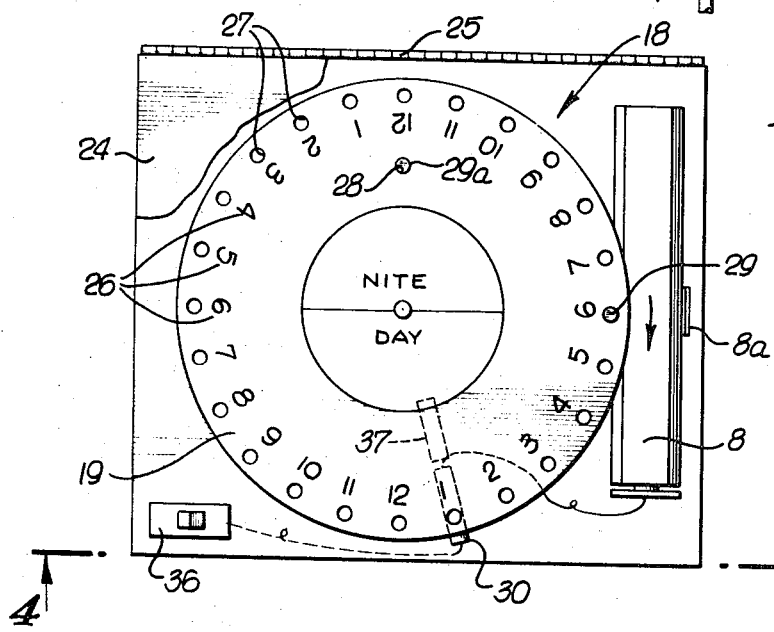
FIG. 2 is a plan view of the timer apparatus clock mechanism in advance of switch operation.
Figure 3:
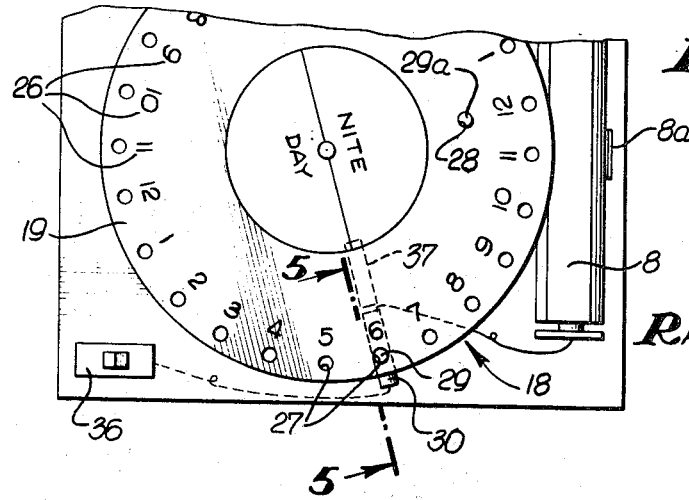
FIG. 3 is a plan view of the clock mechanism in switch operating position.
Figure 4:
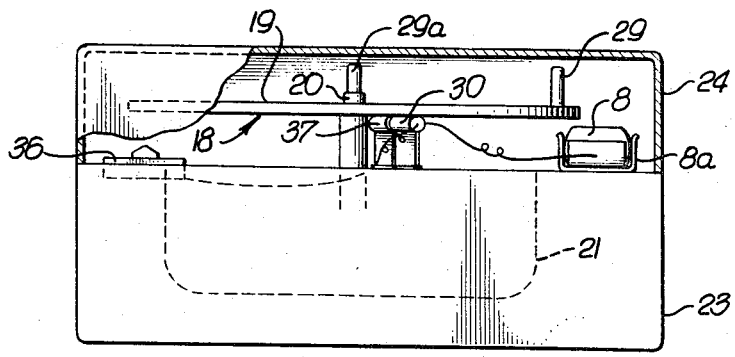
FIG. 4 is a side view in elevation of the clock mechanism taken on line 4—4 in FIG. 2.
Figure 5:
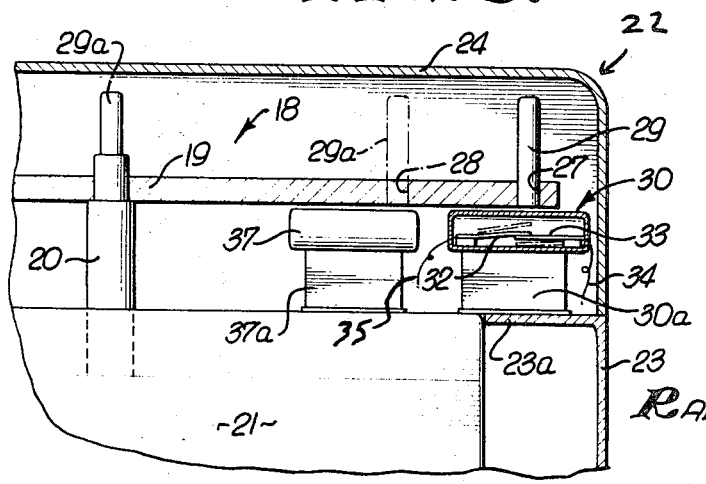
FIG. 5 is a view taken on line 5—5 in FIG. 3 somewhat enlarged and showing operation of the magnetically responsive switch.

Advantageously the present apparatus employs a drag free switch means in the timer actuator 15. Through the use of a reed switch which comprises normally spaced contacts which are deflectable by magnetic flux into contacting relation as the actuating switch, the apparatus actuation can be accomplished without mechanical devices having relatively high power requirements. In addition provision of a clock means enables continuous time-related movement useful in regulating operation of the apparatus. With reference to FIGS. 2, 3 and 4 and, particularly, FIG. 5, the timer actuator 15 is shown in its preferred form to include a clock mechanism 18 having a rotating horizontal member 19 carried on a vertical shaft 20 driven by a motor (not shown) in motor housing 21. The motor may be battery powered and preferably by a battery separate from battery 8. An enclosure 22 having a base portion 23 with internal flange 23a and upper portion 24 hinged at 25 is provided to protect the battery 8 in bracket 8a and clock mechanism 18 from exposure to weather, dirt and the like. The rotating member 19 is subdivided into 24 portions 26 corresponding to the hours in a day with each portion having an outer aperture 27. An inner aperture 28 is also provided in member 19 e.g. in the midnight portion 26. The apertures 27 are sized to accommodate a cylinder 29 of magnetic material or other magnet means. Insertion of the magnetic cylinder 29 in an outer aperture 27 results in the cylinder being carried angularly by the rotating member 19 conveniently one full revolution per day for a member having 24 subdivided portions, as shown. The reed switch 30 is mounted on enclosure base portion flange 23a with bracket 30a to closely underlie the outer edge margin 31 of rotating member 19. In this manner the apertures 27 in the member portions 26 pass directly over the reed switch 30 while aperture 28 does not so pass. Accordingly, insertion of magnetic cylinder 29 in one of apertures 27 results in magnetic flux periodically about the reed switch 30. As shown in FIG. 5 the reed switch 30 comprises a pair of contacts 32, 33 which are normally spaced but which are responsive to the presence of magnetic flux to contact one another to complete a circuit between leads 34, 35. In this manner the presence of magnetic cylinder 29 over the reed switch 30 closes a circuit comprising battery 8, lead 34, contacts 32, 33 lead 35 and the valve actuating circuit schematically indicated at 36. Insertion of the magnetic cylinder 29 in an aperture 27 will result in actuation of the valve at the corresponding hour e.g. 6 a.m. as shown. Use of multiple magnetic cylinders in two or more apertures 27 will result in a corresponding number of valve actuations. Obviously the number of revolutions per day of rotating member 19 and/or the spacing of the apertures 27 or other retaining means for the magnet means used to initiate operation of the apparatus may be varied for particular purposes. The aperture 28 carries an additional magnetic cylinder 29a to operate a second and independent reed switch 37 mounted inboard of reed switch 30 on bracket 37a to underlie aperture 28. This second reed switch 37 operates in the same manner as reed switch 30 but is connected into the skip circuit feature of the present apparatus and will be described presently.

With reference to FIG. 7 the operation of the control portion of the apparatus in an illustrative embodiment is as follows: Assuming manual on-off switch S is closed magnetic cylinder 29 activates the reed switch S-1 (switch 30 in FIGS. 2—5), to close the switch as above described. This causes a pulse of energy, previously stored in the 5 mfd capacitor 40 from the 45 volt battery 8 to be applied through a 100 K resistor 41 across 500 pfd. disc capacitor 42 provided with leakage path 1.2 meg. resistor 43 to an electronic "on" switch S-2 comprised of transistor 44, 5.1 K resistor 45 and transistor 46 and another 5.1 K resistor 47. Application of a positive pulse at the base of transistor 44 e.g. from capacitor 40 turns the switch on. Application of a positive pulse at the base of transistor 46 e.g. from SCR 65 turns the switch S-2 off. An electronic "off" switch S-3 is also provided comprising transistors 48, 50 and 5.1 K resistances 49, 51 which turns on and off in the same manner as the "on" switch in response to positive pulses.

Thus when reed switch S-1 is closed by magnetic flux forces the electronic "on" switch S-2 turns on and the electronic "off" switch S-3 connected to 5 mfd. capacitor 40a and 1 K dropping resistor 53a also turns on by passage of a pulse from capacitor 40 through diode 52, 100 K resistor 53 and 500 pfd. disc capacitor 54 provided with leakage path 1.2 meg. resistor 55 to the base of transistor 48. When "on" switch S-2 turns on the 2,300 mfd. capacitor 57 when "off" switch S-3 is turned on. Capacitor 56 charges from battery 8 across 22 K resistor 58 and charging resistor 59 (100 K), while capacitor 57 charges across 12 K resistor 60 whereby capacitor 57 charges more rapidly than capacitor 56. Capacitor 56 charges to a voltage sufficient to actuate the valve through solenoid coil 61. At this voltage point e.g. 28 volts, the silicon bilateral switch or trigger diode 62 senses the voltage across .1 mfd capacitor 63 and is triggered through 470 ohm resistor 64 causing SCR 65 which is provided with a leakage current path through resistor 71 to turn on and discharge the energy stored in capacitor 56 through the "on" portion 61a of the solenoid coil, opening the valve (not shown) and turning the water on. Simultaneously a positive pulse generated at the cathode of SCR 65 is fed back through diode 66 and 0.047 mfd. capacitor 67 provided with resistor 68 to maintain the capacitor at a suitable reference voltage, to the base of transistor 46. This pulse turns electronic switch S-2 off, which interrupts the charging of the capacitor 56 for the remainder of the initiated cycle. Complete discharge of capacitor 56 is insured through provision of 220 K resistor 69. SCR 65 is connected to diode 70 and to 1 K resistor 71, providing a leakage current path, to prevent inadvertent triggering of the SCR.

The capacitor 57 is also charged by this time by current through switch S-3. Discharge of capacitor 57 to turn the valve off is delayed for a period corresponding to the desired watering span. The time delay, relatively long or short, is achieved by charging the 2,300 mfd. capacitor 72 or the 500 mfd. capacitor 73 respectively with a constant current through 100 K potentiometer 74 and field effect transistor 83. Capacitors 72, 73 are provided with a low impedance discharge path through resistor 75 and diode 75a which prevents stray charging of these capacitors. A ganged switch S-4A, B, C is provided for selecting either a time within a longer range with capacitor 72 1 meg. potentiometer 76, 100 K resistor 77, 12 K resistor 78 and 50 K potentiometer 79; or (as shown) a time within a shorter range with capacitor 73, 1 emg. potentiometer 80, resistor 77, 5.1 K resistor 81 and 50 K potentiometer 82. Switch S-4A, B, C is thus a watering time selector switch capable of a first position providing relatively short watering times e.g. 3—33 minutes and a second position providing relatively long watering times e.g. 20—120 minutes. Setting the minimum for the ranges is accomplished by setting the end resistance by adjusting potentiometers 79 and 82 to a value which will set the minimum required time. Setting the maximum time then is accomplished by adjustment of potentiometers 76 and 80 to an appropriate end resistance. Then adjustment of potentiometer 74 provides values within the minimum and maximum for each set of resistances.

The time delay is dependent on capacitor 72 or 73 charging to a predetermined value. By the provision of a constant current source through operation of field effect transistor 83 having current limiting resistor 84 and potentiometer 74, the voltage across capacitor 72 or 73 changes linearly with time. This voltage is monitored by connecting the gate of field effect transistor 85 having current limiting resistors 86 (100 K), 87 (1.2 meg.) and 88 (12 K) to the capacitor 72 or 73 through 12 K resistor 89 to form a source follower. The input to the gate is very high impedance and thus will not drain off any of the constant current being provided to the capacitor 72 or 73 but will only monitor the absolute voltage thereon. When the voltage at the source $s$ of the field effect transistor 85 reaches a value determined by capacitor 90 at which diode 91, a silicon bilateral switch, fires, the SCR 92 will be triggered by diode 91 through resistor 93 and fire to discharge capacitor 57 through the "off" side 61b of solenoid coil 61, to turn the water off. Complete discharge of the capacitor 57 is insured through provision of a 220 K resistor 94. SCR 92 is connected to diode 95 and 1 K resistor 96 providing a leakage current path, to prevent inadvertent triggering of the SCR.

As with SCR 65, discharge of capacitor 57 through SCR 92 provides a positive pulse through diode 97 and 0.047 mfd. capacitor 98 connected to 1.2 meg. resistor 99, to turn off electronic switch S-3 and complete the watering cycle.

There is also provided in the present apparatus means for blocking operation of the device despite closing of the magnetically responsive reed switch S-1 after passage of the normal interval. Thus as shown in FIGS. 2, 3, 4 and 5, a second reed switch 37 (S-5 in FIG. 7) may be provided inwardly of the valve actuating switch 30 (S-1 in FIG. 7) to underlie the aperture 28 in rotating member 19. In this manner, a magnetic cylinder 29a placed in the aperture will operate the reed switch 37 (S-5), at the same or at a different time e.g. midnight as shown, from reed switch 30 (S-2). Referring to FIG. 7, closing of reed switch S-5 passes current through resistor 107 to cause SCR 100, connected to 1 K resistor 101 to provide a leakage current path to prevent inadvertent triggering of the SCR, to fire, allowing stored energy in 500 mfd. capacitor 102 to actuate solenoid coil 103. This coil as depicted acts once a day to operate a skip device such as a rotor (not shown) which after a preselected number of such operations e.g. 7 acts to open switch S-6 which blocks transmission of power from battery 8 through 1 K resistor 109 for the period during which the switch S-6 is open. Continued operation of the skip device will restore connection between the battery 8 and the remainder of the apparatus. A 0.1 mfd. capacitor 104, 1.2 meg. resistor 105, 100 K resistor 106, 470 ohm resistor 107, and voltage suppressing diode 108 complete the components of the skip circuit.

In preferred practice the valve actuator is a reversing magnet solenoid. This device utilizes a pair of magnets, one surrounded by a coil and switchable in its flux direction by appropriate current direction in the coil and the other permanent. Between the magnets a two-piece plunger operates to close the valve when the magnetic are opposed and to open the valve when the magnetic flux fields of both magnets are aiding. The device is available from Skinner Electric Valve Division, Skinner Precision Industries, New Britain, Connecticut. It is a feature of the device that once the plunger is closed or open, i.e. in either position, no current is required to maintain that condition and a short (20 msec.) current flow will reverse the switchable element polarity and thus the position of the plunger.

I claim:

1. Apparatus for the timed operation of an irrigating system valve having a solenoid operated actuator which includes first means supplying current to the solenoid in a first direction to open the valve, second means supplying current to the solenoid in the reverse direction to close the valve, said second means including a time delay means, a power supply, and switch means to simultaneously connect said power supply to the first and second current supplying means to open said valve for a period determined by said time delay means.

2. Apparatus according to claim 1 in which said switch means comprises a magnetically responsive switch and actuating magnet means, said switch and magnet means being relatively movable.

3. Apparatus according to claim 2 in which said switch comprises normally spaced contacts which are deflectable into contacting relation in a magnetic field.

4. Apparatus according to claim 2 in which said magnet means has time related continuous movement relative to said switch.

5. Apparatus according to claim 4 including also a clock means having a motor and a rotating member driven by the motor, said rotating member being arranged to have portionwise continuous proximity to said switch and adapted to carry said magnet means angularly thereon into and out of actuating proximity with said switch.

6. Apparatus according to claim 5 including also a plurality of alternative magnet retaining means carried on the member in circularly spaced relation about the member rotational axis.

7. Apparatus according to claim 6 in which said member is driven at one revolution per day and is subdivided into plural portions with a magnet retaining means for each portion.

8. Apparatus according to claim 7 in which the magnet retaining means comprise apertures formed in the rotating member and said magnet means comprises a magnet body receivable in said member apertures.

9. Apparatus according to claim 8 in which said power supply comprises a battery.

10. Apparatus according to claim 2 in which said power supply comprises a battery.

11. Apparatus according to claim 10 in which said first current supplying means includes a first capacitor storing charge from the battery and means discharging said first capacitor through the coil of the solenoid upon a predetermined level of charge being stored in the capacitor sufficient to actuate the valve.

12. Apparatus according to claim 11 including also a first electronic switch between the magnetically responsive switch and said first capacitor arranged to be turned on by the closing of said magnetically responsive switch.

13. Apparatus according to claim 12 including also means turning off said first electronic switch on discharge of said first capacitor to interrupt charging thereof.

14. Apparatus according to claim 12 in which said first capacitor discharging means includes a trigger diode responsive to the level of charge on said first capacitor and an SCR triggered by said diode to discharge the first capacitor and to supply current to the coil of the solenoid to actuate the valve and to said first electronic switch to turn the same off to interrupt charging of said first capacitor.

15. Apparatus according to claim 11 in which said second current supplying means includes a second capacitor storing charge from the battery and means discharging said second capacitor through the coil of the solenoid upon passage of a predetermined time delay to reverse actuate the valve.

16. Apparatus according to claim 12 including also a second electronic switch between the magnetically responsive switch and said first capacitor arranged to be turned on by the closing of said magnetically responsive switch.

17. Apparatus according to claim 16 including also means turning off said second electronic switch on discharge of said second capacitor to interrupt charging thereof.

18. Apparatus according to claim 17 in which said time delay means includes a capacitor and in which said second capacitor discharging means includes a trigger diode responsive to a predetermined level of charge stored in said time delay capacitor and an SCR triggered by said diode to discharge the second capacitor and to supply current to the coil of the solenoid to actuate the valve and to said second electronic switch to turn the same off and interrupt charging of said second capacitor.

19. Apparatus according to claim 18 including means charging said second capacitor more rapidly than said first capacitor.

20. Apparatus according to claim 19 including also a resistance in parallel with each of said first and second capacitors.

21. Apparatus according to claim 18 in which said time delay means includes a time delay capacitor and a constant current source connected thereto, said trigger diode being responsive to the level of charge on said time delay capacitor to trigger said SCR to discharge said second capacitor.

22. Apparatus according to claim 21 including a second and different time delay means having a second time delay capacitor and means for alternately connecting said trigger diode through either of said time delay capacitors to said battery to provide alternate time delays.

23. Apparatus according to claim 22 including also a variable resistance connected to said time delay capacitors to vary said time delay.

24. Apparatus according to claim 1 including also means selectively blocking connection of the power supply to said first and second current supply means by the closing of said switch means.

25. Apparatus according to claim 24 in which said blocking means includes a normally closed blocking switch openable to block power supply connection in response to occurrence of a predetermined number of such connections.

26. Irrigation control apparatus including a valve controlling irrigating water delivery, said valve being solenoid actuated and means for timed operation of the valve solenoid including a battery, a first capacitor and a second capacitor each capable of storing charge from the battery sufficient to actuate the solenoid valve, a magnetically operated switch for connecting the first and second capacitors to the battery simultaneously, actuating means for said switch including a magnet having time related movement, means for blocking battery connection to the capacitors upon selected switch actuations to skip cycling the apparatus, means discharging the first capacitor through the solenoid coil in a manner to open the valve, means discharging the second capacitor in a manner to close the valve, means interrupting charging of capacitor upon discharge, and means delaying discharge of the second capacitor for a preselected period corresponding to a desired length irrigation period, said capacitor discharging means including a trigger diode responsive to the stored charge level in an associated capacitor and an SCR triggered by the diode to sequentially discharge the first and second capacitor through the solenoid coil.